United States Patent [19]

Busse

[11] 4,344,172
[45] Aug. 10, 1982

[54] SYSTEM FOR MEASURING THE RADIATION POWER OF POWER-MODULATED TRANSMITTERS, IN PARTICULAR OF LASERS

[76] Inventor: Gerhard Busse, No. 14, Rosenheimer Landstrasse, 8012 Ottobrunn, Fed. Rep. of Germany

[21] Appl. No.: 126,632

[22] Filed: Mar. 3, 1980

[30] Foreign Application Priority Data

Mar. 2, 1979 [DE] Fed. Rep. of Germany ....... 2908157
Dec. 10, 1979 [DE] Fed. Rep. of Germany ....... 2949564

[51] Int. Cl.³ .............................................. H01S 3/10
[52] U.S. Cl. .......................................... 372/29; 372/9
[58] Field of Search ...................... 331/94.5 S, 94.5 M

[56] References Cited

U.S. PATENT DOCUMENTS 3,842,367  8/1974  Schlossberg .................... 331/94.5 S
3,921,099 11/1975  Abrams et al. .................. 331/94.5 S Primary Examiner—William L. Sikes
Assistant Examiner—Léon Scott, Jr.
Attorney, Agent, or Firm—John C. Smith, Jr.

[57] ABSTRACT

A system for measuring the radiation power of power-modulated transmitters, in particular of lasers, includes an opto-acoustical converter converting the radiation modulation into gas-pressure modulation. The components of the opto-acoustical converter disposed in the radiation path are virtually completely transparent or reflecting for the radiation to be measured.

10 Claims, 6 Drawing Figures

SYSTEM FOR MEASURING THE RADIATION POWER OF POWER-MODULATED TRANSMITTERS, IN PARTICULAR OF LASERS

BACKGROUND OF THE INVENTION

This invention relates to a system for measuring the radiation power of power-modulated transmitters, in particular of lasers, including an opto-acoustical converter converting the radiation modulation into gas-pressure modulation.

When operating with power intense radiation sources, in particular with lasers, a monitoring of the radiation power is required for measurement reasons and in view of protection regulations. This power control is at present effected in such a way that permanently or temporarily at least a part of the radiation is supplied to a detector which completely absorbs the radiation. The conventional methods mostly cause an interfering access to the radiation path and require labor for adjusting the radiation of the detector. An alteration of the adjustment may indicate an actually not existing variation of the radiation power during measurement.

A detector known for such radiation power measurements, in particular in the infra-red range, is the Golay cell operating on the opto-acoustical principle. It comprises a gas-filled space which has a window for the passage of the modulated radiation to be measured and opposite to the window a black surface completely absorbing the radiation. The space is secluded by a diaphragm deflectible by pressure fluctuations of the gas, the deflections of which diaphragm are measured, e.g. by means of a mirror arrangement. By absorption of the radiation at the black surface, the gas is heated with the frequency of the radiation modulation. The pulsations of the gas pressure caused thereby are proportional to the radiation power in their amplitudes and may therefore serve as a measure therefor. In other measuring systems based on the opto-acoustical effect, microphones have also been employed for the measurement of gas pressure fluctuations.

SUMMARY OF THE INVENTION

It is, therefore, the object of the present invention to provide a measuring system of the type set forth which permits to measure and/or to control the radiation power of a power-modulated transmitter without affecting the radiation or with affecting the radiation as slightly as possible.

To attain this object the present invention provides a system for measuring the radiation power of power-modulated transmitters, in particular of lasers, including an opto-acoustical converter converting the radiation modulation into gas-pressure modulation, wherein the components of the opto-acoustical converter disposed in the radiation path are virtually completely transparent or reflecting for the radiation to be measured.

The invention is based on the recognition that it is mostly not necessary for a measuring system based on the opto-acoustical effect, e.g. of the type of a Golay cell, for the measurement of the radiation power to absorb the entire radiation at a black surface, but that for producing measurable gas pressure fluctuations the slight radiation absorption is sufficient which occurs upon passing of the radiation through almost completely transparent windows or upon reflection at reflecting panes.

A particularly sample and convenient arrangement of the measuring system is obtained when the end panes of the gas-filled cell disposed in the radiation path are defined by optical components of the radiation source which are transparent for the radiation to be measured (windows or lenses) or reflect it (mirrors). The extremely low radiation losses in these components suffice for not too weak radiation sources in order to cause a heating of the gas therebetween via the opto-acoustical effect. This causes—provided the confinement of a volume and a modulation of the radiation are possible—pressure fluctuations which can be detected with a microphone. Since in this arrangement in the radiation path there are only provided the components per se present in the radiation source, no additional power loss occurs.

An improvement is further obtained in that the measuring device detects the thermal deformation or strain variations of the transparent or reflecting body caused by radiation modulation.

It is thereby achieved that for measurement detection of the temperature modulation caused by the radiation modulation of the transparent of reflecting bodies disposed in the radiation path no configuration thereof as components of an opto-acoustical converter with a gas-filled cell is required, but that as measurement magnitude the deformation or strain variations of the transparent or reflecting body caused by temperature modulation may be used directly.

BRIEF DESCRIPTION OF THE DRAWINGS

Embodiments of the invention will now be described by way of example and with reference to the accompanying drawings, in which.

DESCRIPTION OF THE PREFERRED EMBODIMENTS

Figure 1:
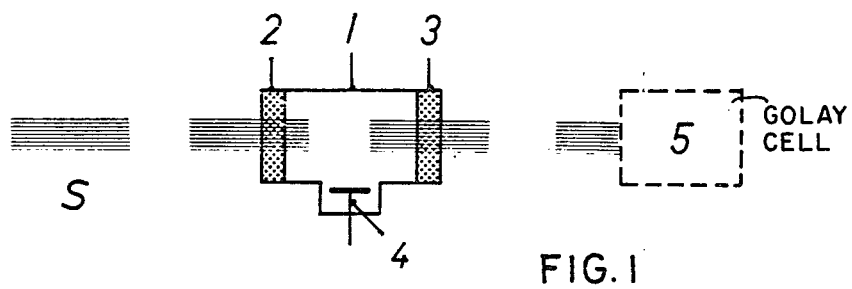
FIG. 1 is a measuring system according to the invention arranged in the radiation path of a power-modulated light beam.

In the measuring system of FIG. 1, a light beam S is emitted either from a power-modulated radiation source, or it originates from a radiation source with constant power and is modulated by a chopper. The measuring system serving to monitor the radiation power comprises a gas-, e.g. air-filled housing 1, which gas is absorption-free for the radiation to be measured, said housing having windows 2 and 3 transparent for the radiation to be measured, said windows being installed gas-tightly in said housing 1. A microphone 4 is connected directly or via a short line to the interior of the housing 1. The slight temperature variations caused upon passing of the modulated beam S, at the windows 2 and 3, cause slight pressure variations in the gas filling of the housing 1 with the frequency of the radiation power modulation. The pressure variations act upon the diaphragm of the microphone 4 and cause an electrical alternating signal of the same frequency at the output of the microphone. The alternating signal may be supplied to a measuring instrument, or it may be used for a power control of the radiation source.

The radiation power absorbed at the windows 2 and 3 is very low and may for instance amount to only 1 percent per window or less. The reflexion losses may be reduced by inclining the windows according to the Brewster angle. It is therefore possible to leave the measuring system in the radiation path during operation. It also requires no special precise adjustment.

For calibrating the measuring system, the radiation after passing through the system is directed to a radiation measuring device of known sensitivity, e.g. to a Golay cell 5 illustrated in phantom in FIG. 1. A comparison of the radiation power measured with the Golay cell 5 with the values determined at the microphone output permits the establishment of a calibration curve which may be used for further measurements.

Figure 2:
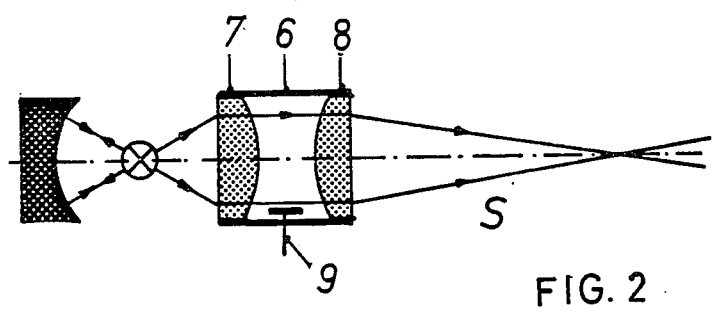
FIG. 2 is a measuring system wherein a two-lenses condenser is formed as opto-acoustical converter for radiation power measurement.

The configuration of a measuring system according to the invention in using optical components per se present, of a radiation source, is shown in FIG. 2 for a condenser with two lenses as used for instance in projectors. The two lenses 7 and 8 of the condenser define the windows of an opto-acoustical converter. They are gas-tightly connected by a housing 6. A microphone 9 is connected to the interior of the housing 6, the output signal of which microphone is measured or controls the power of the light source. For modulation of the light beam S e.g. the slightly pulsing radiation power of the light source as a result of the mains frequency may be used.

Figure 3:
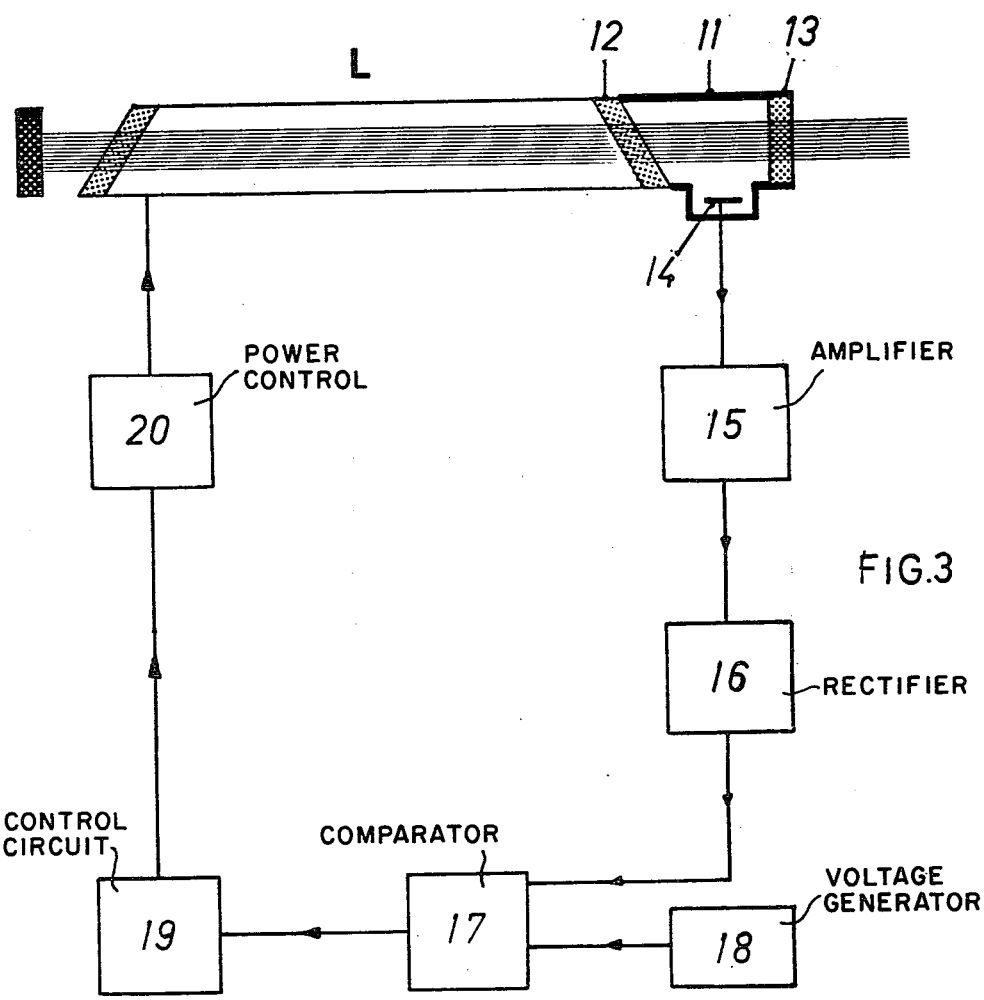
FIG. 3 is a power-modulated laser the one Brewster window and the decoupling mirror adjacent thereto of which define the windows of an opto-acoustical converter, with a block diagram for keeping constant the radiation power of the laser.

According to the embodiment of FIG. 3, the measuring system is integrated into a pulsed laser L. The space between one of the Brewster windows 12 of the laser and a decoupling mirror 13 adjacent to this window 12 is secluded gas-tightly by a housing 11 and connected to a microphone 14. This arrangement has as a condition that the laser power, e.g. by Q-switch operation, is pulsed or modulated.

In FIG. 3 a block diagram for the power stabilization of the laser L has also been plotted. The output signal of the microphone 14 is for this purpose supplied via an alternating voltage amplifier 15 and a rectifier 16 to a comparator 17 and there compared with the output voltage of a predetermined value generator 18. The comparator output is connected to a control circuit 19 for the power control 20 of the laser L.

It has been noted that for measurements with laser radiation in different spectrum ranges of 632 nm, 10 $\mu$m and 0.4 mm wavelength with the measuring system according to the invention even when using very simple capacitor microphones radiation powers of $10^{-5}$ W are able to be detected. By optimizing the microphones and the cell geometry, an increase of sensitivity to $10^{-7}$ W should be able to be reached.

The invention also permits a simple measurement of absorption losses in that the radiation power is determined with measuring systems according to the invention upstream and downstream of the sample.

Figure 4:
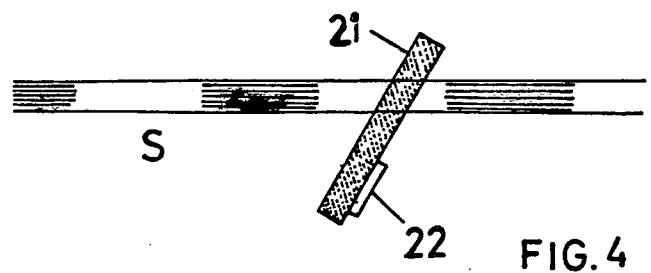
FIG. 4 is the arrangement of a measuring probe at a window disposed in the radiation path.

A further example is illustrated in FIG. 4. Therein, a window 21, e.g. a Brewster window, through which the beam S of a laser passes, is firmly connected in its not exposed surface region to a measuring element, e.g. a strain gauge or a piezo-electrical sensor 22. The very slight periodic variations of temperature distribution in the window caused by the radiation modulation suffice to result in measurable alternating voltage signals in the measuring element.

Figure 5:
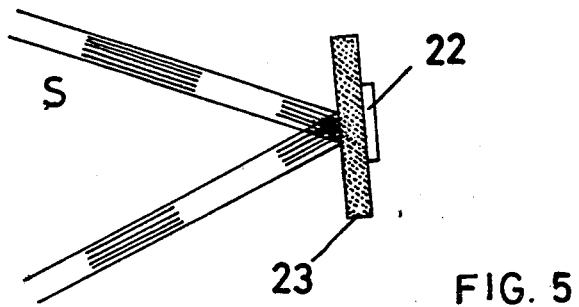
FIG. 5 is the arrangement of a measuring probe at a mirror.

An arrangement comparable in its function is shown in FIG. 5 for a mirror 23 the measuring element 22 of which may likewise be formed as a strain gauge or as a piezo-electrical sensor.

Figure 6:
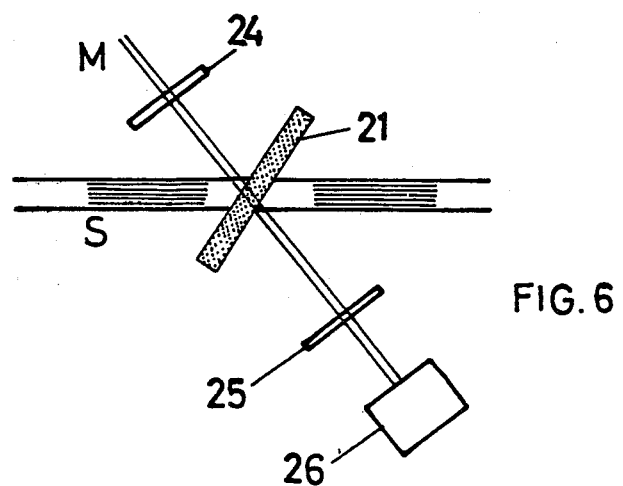
FIG. 6 is a strain-optical measuring system.

The strain-optical measuring system illustrated in FIG. 6 comprises two crossing polarisators 24 and 25 and a photo cell 26. The area of the window 21 through which a laser beam S passes is disposed between the polarisators 24 and 25. The periodical temperature variations in the window 21 according to the radiation power modulation cause periodical strain variations in the window which are registered by the photo cell 26 as brightness modulation of a measuring beam M passing through the polarisators.

As described in FIG. 3, this system may also be used for keeping constant the radiation power of a radiation source, in particular of a laser.

A particular advantage is that it does not require essential installations into the radiation source, but that the components thereof present any how may serve directly as measurement objects.

The invention may be embodied in other specific forms without departing from the spirit or essential characteristics thereof. The embodiments are therefore to be considered in all respects as illustrative and not restrictive.

What is claimed is:

1. Apparatus for measuring the power of laser radiation transmitted along a predetermined path comprising:
   (a) a housing defined by walls and containing a gas which is absorption-free with respect to the laser radiation to be measured, said housing including a first transparent window in one wall thereof and a second transparent window or a reflecting body in a wall opposite said first transparent window whereby when said housing is positioned in said path of said laser radiation said laser radiation will pass through said first and second transparent windows or pass through said first transparent window and be reflected by said reflecting body; and
   (b) transducer means in said housing for sensing pressure variations in said gas and for emitting an electrical signal indicating said pressure variations, said pressure variations being proportional of the power of said laser radiation;
   (c) whereby the power of said laser radiation transmitted along said predetermined path may be determined from the signal emitted by said transducer means.

2. Apparatus according to claim 1 wherein said transducer means comprises a microphone.

3. Apparatus according to claim 1 wherein said first and second transparent windows are Brewster windows respectively.

4. Apparatus according to claim 1 wherein said first and second transparent windows are lenses of an optical condenser.

5. A system for maintaining constant the power of laser radiation transmitted along a predetermined path from laser radiation generating means, said system comprising
   (a) apparatus for measuring the power of said laser radiation as set forth in claim 2;

(b) means connected to said microphone for amplifying the electrical signal emitted by said microphone;
(c) means connected to said amplifying means for rectifying said amplified signal from said amplifying means;
(d) means for generating a standard electrical signal of predetermined value;
(e) comparator means connected to said rectifying means and said generating means for comparing said signal from said rectifying means with said standard signal from said generating means; and
(f) control circuit means connected to said comparator means and said laser radiation generating means to control the power of said laser radiation from said laser radiation generating means.

6. Apparatus for measuring the power of laser radiation transmitted along a predetermined path comprising:
(a) a transparent window or reflecting body; and
(b) means associated with said transparent window or reflecting body for detecting thermal deformation or strain variations of said transparent window or reflecting body caused by radiation modulation and for emitting a signal indicating said thermal deformation or strain variations, said thermal deformation or strain variations being proportional to the power of said laser radiation;
(c) whereby when said transparent window or reflecting body is positioned in said path of said laser radiation the power of said laser radiation transmitted along said predetermined path may be determined from the signal emitted by said thermal deformation or strain variation detecting means.

7. Apparatus according to claim 6 wherein said detecting means comprises a strain gauge firmly connected to a surface of said transparent window or reflecting body.

8. Apparatus according to claim 6 wherein said detecting means comprises a piezo-electrical sensor firmly connected to a surface of said transparent window or reflecting body.

9. Apparatus according to claim 6 wherein said detecting means is an interferometer.

10. Apparatus according to claim 6 wherein said detecting means is a polarimeter.

* * * * *